(12) United States Patent
Gass et al.

(10) Patent No.: US 10,864,651 B2
(45) Date of Patent: Dec. 15, 2020

(54) CONTROL SYSTEMS FOR POWER TOOLS

(71) Applicant: SawStop Holding LLC, Tualatin, OR (US)

(72) Inventors: Stephen F. Gass, West Linn, OR (US); Louis R. Slamka, Vancouver, WA (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 16/600,824

(22) Filed: Oct. 14, 2019

(65) Prior Publication Data

US 2020/0108522 A1    Apr. 9, 2020

Related U.S. Application Data

(63) Continuation of application No. 14/539,487, filed on Nov. 12, 2014, now Pat. No. 10,442,107.

(60) Provisional application No. 61/903,305, filed on Nov. 12, 2013.

(51) Int. Cl.
*B27G 19/02*    (2006.01)
*F16P 3/00*    (2006.01)

(52) U.S. Cl.
CPC ............... *B27G 19/02* (2013.01); *F16P 3/00* (2013.01); *Y10T 83/7793* (2015.04); *Y10T 83/869* (2015.04)

(58) Field of Classification Search
CPC .......... B27G 19/02; F16P 3/00; Y10T 83/869; Y10T 83/7793
See application file for complete search history.

(56) References Cited

U.S. PATENT DOCUMENTS

| | | | | |
|---|---|---|---|---|
| 4,074,602 | A * | 2/1978 | Brower | B27B 5/20 192/129 A |
| 4,543,723 | A * | 10/1985 | Bortfeld | B27B 17/0008 200/553 |
| 5,724,737 | A * | 3/1998 | Stones | B27B 17/0008 192/131 R |
| 6,418,829 | B1 * | 7/2002 | Pilchowski | B23D 59/001 83/397 |
| 7,055,417 | B1 * | 6/2006 | Gass | B23D 59/001 83/477.1 |
| 8,336,432 | B1 * | 12/2012 | Butler | B23Q 11/0891 83/58 |
| 8,752,644 | B2 * | 6/2014 | Weusthof | B27B 5/29 173/170 |
| 2002/0170399 | A1 * | 11/2002 | Gass | B27G 19/02 83/62.1 |
| 2008/0115642 | A1 * | 5/2008 | Chang | B27B 5/29 83/435.27 |

(Continued)

*Primary Examiner* — Omar Flores Sanchez

(57) ABSTRACT

Control systems are disclosed for power tools such as table saws, miter saws, band saws, hand-held circular saws, jointers, shapers, routers, and up-cut saws. The control systems include systems to turn power tools on and off, and to control the supply of power to motors. The systems to turn power tools on and off may include dual switches that must be operated together to turn a power tool on. The systems to provide power to motors may include dual relays in series implemented with methods to minimize arcing and welding of the relays. The systems described herein may be implemented in power tools equipped with active injury mitigation technology.

4 Claims, 7 Drawing Sheets

(56) References Cited

U.S. PATENT DOCUMENTS

| | | | | |
|---|---|---|---|---|
| 2010/0307307 | A1* | 12/2010 | Butler | B23D 59/006 |
| | | | | 83/58 |
| 2011/0061769 | A1* | 3/2011 | Gass | B27G 19/06 |
| | | | | 144/382 |
| 2012/0023761 | A1* | 2/2012 | Martinsson | A01G 3/053 |
| | | | | 30/381 |
| 2012/0031635 | A1* | 2/2012 | Svennung | F16P 3/00 |
| | | | | 173/20 |
| 2012/0090439 | A1* | 4/2012 | Butler | B27G 19/02 |
| | | | | 83/68 |
| 2016/0088792 | A1* | 3/2016 | Yamaoka | A01D 34/733 |
| | | | | 30/276 |

* cited by examiner

CONTROL SYSTEMS FOR POWER TOOLS

CROSS-REFERENCE TO RELATED APPLICATIONS

This application is a continuation of U.S. patent application Ser. No. 14/539,487, filed Nov. 12, 2014, which claims the benefit of and priority from U.S. Provisional Patent Application Ser. No. 61/903,305, filed Nov. 12, 2013, which is incorporated herein by reference.

TECHNICAL FIELD

The present specification relates to control systems for power tools such as table saws, miter saws, band saws, hand-held circular saws, jointers, shapers, routers, up-cut saws, and other machinery.

BACKGROUND

Power tools such as table saws, miter saws, band saws, hand-held circular saws, jointers, shapers, routers, and up-cut saws are used to cut and shape material. In most power tools a user simply flips a switch to start the tool. The switch closes a circuit so that electric current flows through the switch to a motor, and the motor moves a blade or cutter.

Power tools with active injury mitigation technology are controlled differently. Active injury mitigation technology refers to technology that detects contact or proximity between a person and a spinning blade or cutter, and then performs some predetermined action to mitigate injury, such as stopping and/or retracting the blade or cutter. Exemplary implementations of active injury mitigation technology are described in International Patent Application Publication No. WO 01/26064 A2, which is incorporated herein by reference. In tools equipped with active injury mitigation technology, a user also flips a switch to start the tool, but electric current does not typically flow through the switch to a motor. Instead, the switch requests or signals a microprocessor to start the motor, and the microprocessor then does so, provided any other conditions monitored by the microprocessor are satisfied.

This specification describes improved systems to control the operation of a power tool. The improved systems are particularly, but not exclusively, applicable to power tools with active injury mitigation technology. The improved systems, for example, control the supply of power to a motor, enhance reliability, and avoid unintended activation of the power tool.

DETAILED DESCRIPTION

Figure 1:
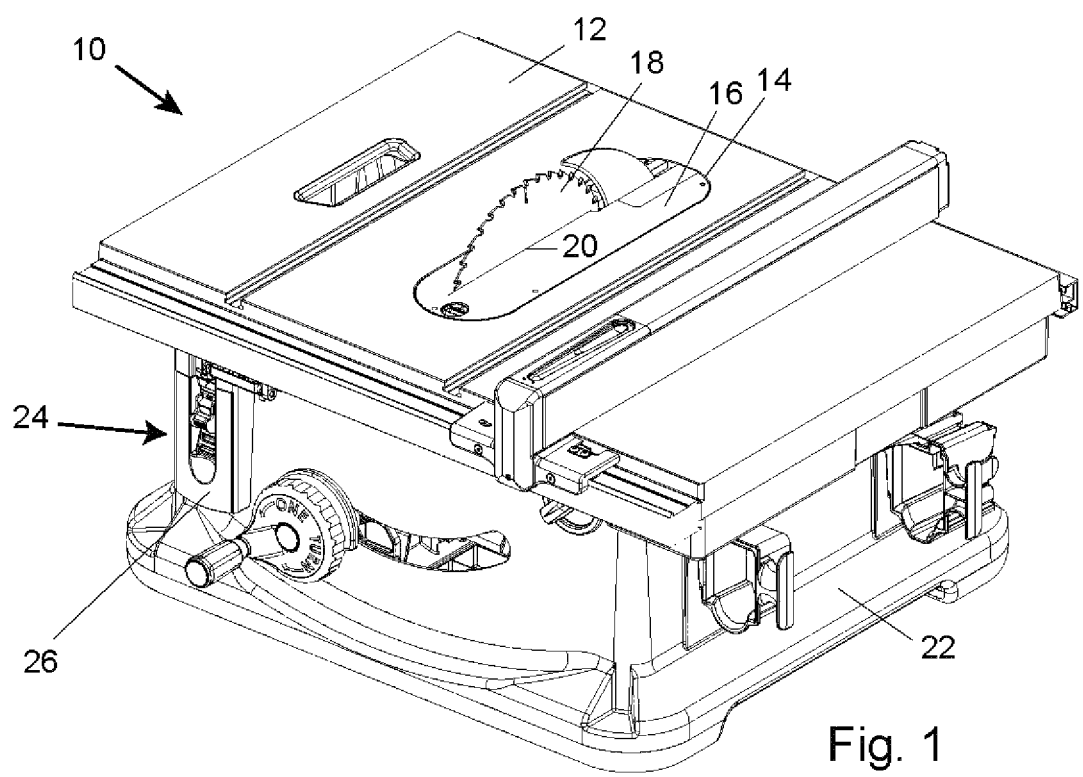
FIG. 1 shows a table saw.

FIG. 1 shows a table saw 10, which is a type of power tool. The table saw includes a table 12 with an opening 14 and an insert 16 in the opening. A blade 18 extends up through a slot 20 in the insert. A housing 22 supports the table and a motor is within the housing. The motor is operably connected to the blade to drive or spin the blade. To use the table saw, a user places a work piece on the table and slides it into contact with the spinning blade to make a cut. Other types of power tools have different configurations, but they normally all include a cutter of some type driven by a motor.

A power tool such as table saw 10 is started and stopped by a user flipping or triggering a switch. Table saw 10 includes a switchbox 24 mounted to the front of saw 10. Switchbox 24 includes a paddle 26 that a user pulls out to start the saw and pushes in to stop the saw. Switchbox 24 is described in more detail in U.S. Provisional Patent Application Ser. No. 61/898,964, titled "Table Saws," filed Nov. 1, 2013, which is incorporated herein by reference.

Figure 2:
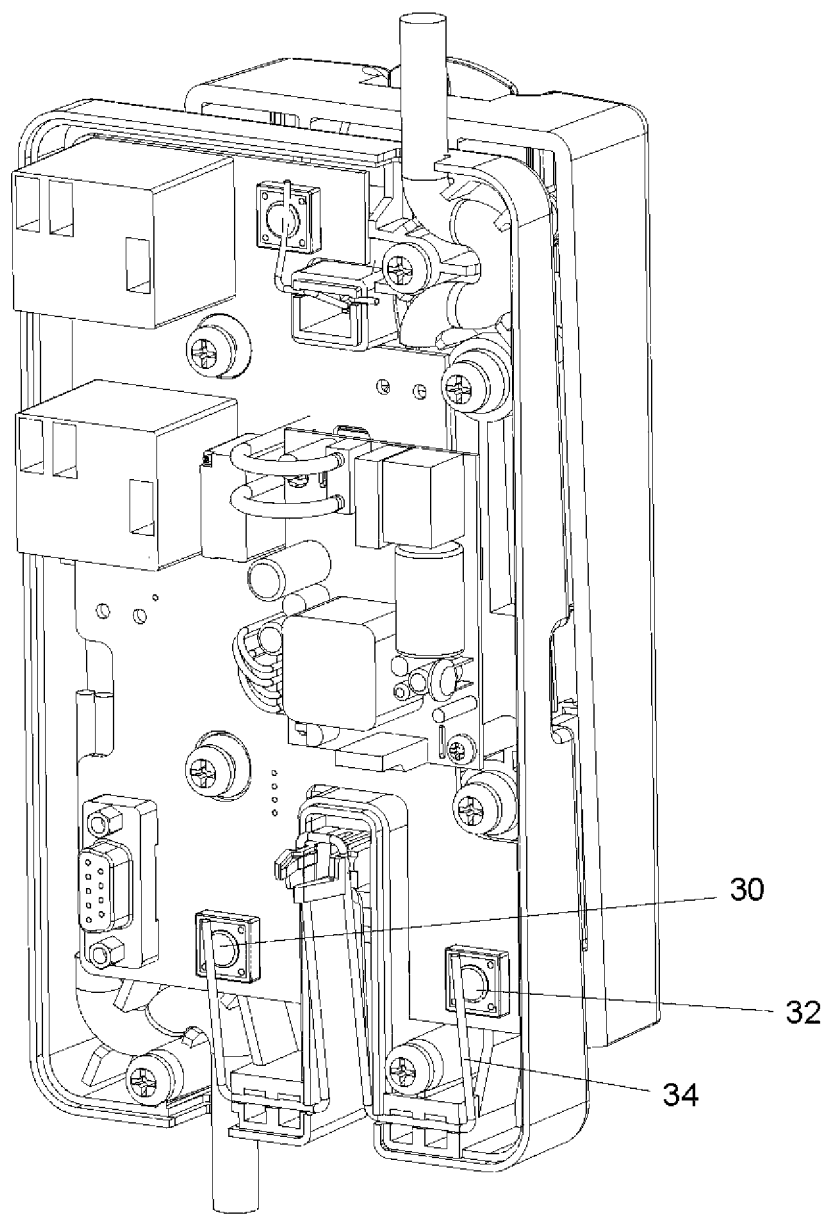
FIG. 2 shows a circuit board in a switchbox.

When a user pulls paddle 26 out, the motion of the paddle depresses two tactile switches on a circuit board inside the switchbox. The tactile switches, in turn, send a request to a microprocessor to start the motor (the microprocessor is also on the circuit board inside the switchbox). FIG. 2 shows a circuit board in a switchbox, with the back of the switchbox removed so the circuit board is visible. The two tactile switches are shown at 30 and 32. The switchbox is configured so that a stiff wire form 34 depresses the two tactile switches when a user pulls paddle 26 out.

Figure 3:
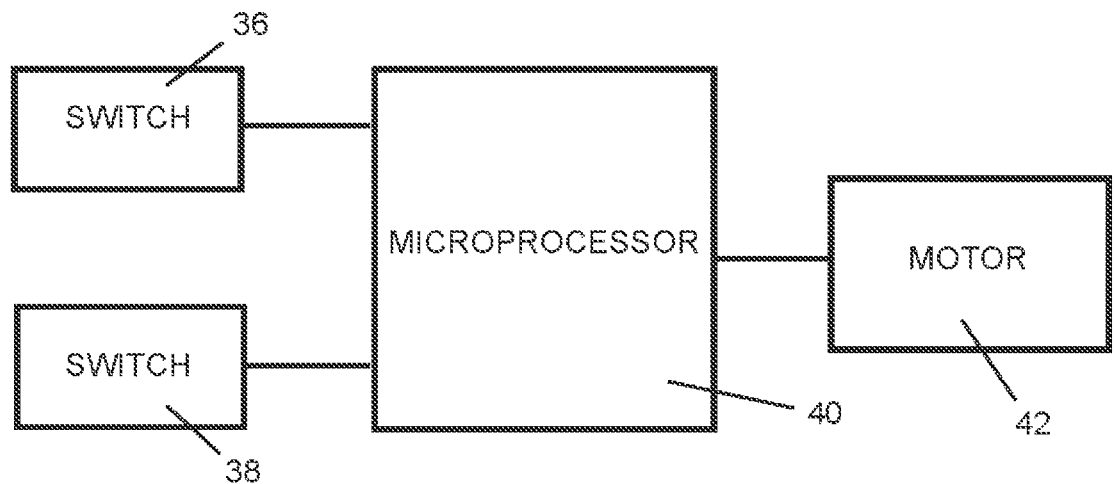
FIG. 3 shows a schematic drawing of a motor control system.

FIG. 3 is a schematic drawing of such a system, showing switches 36 and 38, a microprocessor 40, and a motor 42. The microprocessor will start the motor when it receives signals indicating both switches 36 and 38 have been triggered, provided any other conditions monitored by the microprocessor are also satisfied. When a user pushes paddle 26 in, the switches are released to turn the saw off. Switches 36 and 38 may be thought of as arranged in parallel.

Switches 36 and 38 may be tactile switches 30 and 32 shown in FIG. 2. Alternatively, switches 36 and 38 may be other types of switches. As used herein, switches refers generally to devices which can controllably change state in a detectable fashion. For example, switches 36 and 38 may comprise Hall effect sensors and magnets. In that example, pushing and pulling paddle 26 in and out would move magnets past sensors, or vice versa, to signal or trigger the saw to stop and start. Various arrangements of sensors and magnets could be used, for example, two magnets could move past two sensors, one magnet could move past two sensors, or one sensor could move past two magnets.

Requiring two switches to be triggered to start the saw prevents the saw from starting if one switch is somehow triggered unintentionally or if one switch fails to a closed or "on" state because the microprocessor simply will not start the motor unless both switches are triggered. Using two switches may be thought of as a fail-safe that provides redundant mechanical sensing contacts to guard against inadvertent saw activation. It also protects against a false signal that might otherwise be interpreted by the microprocessor as a user turning the saw on. For example, some active injury mitigation systems use what is called a "brake cartridge" to stop the blade when a person accidentally contacts the spinning blade, and the brake cartridge includes a microprocessor to perform various operations of the saw and to control the active injury mitigation systems. For instance, the microprocessor in the brake cartridge can control a contact detection system to detect contact between a person and the blade, a reaction system to mitigate injury when contact is detected, and a rotation sense system to sense blade rotation. The cartridge microprocessor can also turn the motor on and off when a user pulls or pushes paddle 26 out or in, provided any other conditions monitored by the microprocessor are satisfied. A cable extends between the switchbox and the brake cartridge to signal the microprocessor when the switches have been triggered, among other things. A worn, crimped, or damaged cable might trigger activation of (or falsely engage) the motor by grounding out a conductor in the cable that is intended to indicate a user turned on the saw by a signal going low on the conductor, or by contacting a voltage supply in a system where a high signal is intended to indicate a user turned the saw on.

Microprocessor 40 monitors switches 36 and 38 and may turn the motor on only if both switches were triggered or engaged within a predetermined period of time. For example, the microprocessor could check that both switches were triggered within 100 milliseconds of each other, otherwise the microprocessor would not start the motor. This provides further protection against unintentional triggering of the motor.

Microprocessor 40 will turn the motor off if either switch 36 or 38 triggers the saw to stop, or if both switches do so. The microprocessor can also require that a switch provide a signal for a predetermined period of time before turning the motor off. For example, the microprocessor could check that a mechanical switch was open for 10 to 30 milliseconds, and only stop the motor if that condition were satisfied. This prevents the microprocessor from stopping the motor due to electrical noise that might affect the signal from the switch for a brief period of time. Similarly, microprocessor 40 can look for the signals from switches 36 and 38 to be stable for a predetermined period of time before starting the motor, for example, 10 to 30 milliseconds. These steps are sometimes referred to as debouncing because the microprocessor checks to make sure the signals from the switches are not bouncing between different values or states, or responding to brief transient electrical noise.

The microprocessor can also look for the signal from each switch to have been in a different state prior to the switch's current state. For example, if depressing a mechanical switch makes a line to the microprocessor go low and releasing the switch makes the line go high, the microprocessor can check to see if the current signal from the switch is low and the prior signal from the switch was high, and then start the motor only if that condition were satisfied within a predetermined time. Also, the microprocessor can be programmed to ignore any new motor start requests unless a start switch has been in the off position for a certain length of time.

Dual switches as described herein, and equivalents, may be referred to as switch means for providing a redundant signal to start a motor. Using dual switches as described avoids the possibility of a single-point failure resulting in what might be an unsafe condition.

In table saw 10, when switches 36 and 38 are triggered, dual mechanical relays arranged in series with a motor provide electrical power to the motor. A relay is an electromechanical switch that closes (or makes contact) and opens (or breaks contact) under the control of another electrical circuit. A relay is made from a ferrous metal core surrounded by a wire coil. Electric current passing through the coil creates an electromagnetic force that moves an armature relative to the coil/core, and movement of the armature closes or opens conductive contacts to make or break a circuit. The armature or a portion of the armature may comprise one of the contacts. The contacts are typically held apart or open by a spring, and movement of the armature overcomes the force of the spring to move the contacts together. When the contacts are closed, electricity flows through the contacts to power a motor, for example. When the coil is de-energized, there is no longer a magnetic force opposing the spring so the spring force separates the contacts. When the contacts are separated, the circuit continuity is disrupted and no electricity flows through the relay. The contacts must be sized to accommodate the amount of current intended to flow through the relay. The coil/core/armature must be sized to overcome the spring force and provide enough magnetism in the core to open and close the contacts. The spring must be sized to reliably open the contacts when the coil is not energized.

Figure 4:
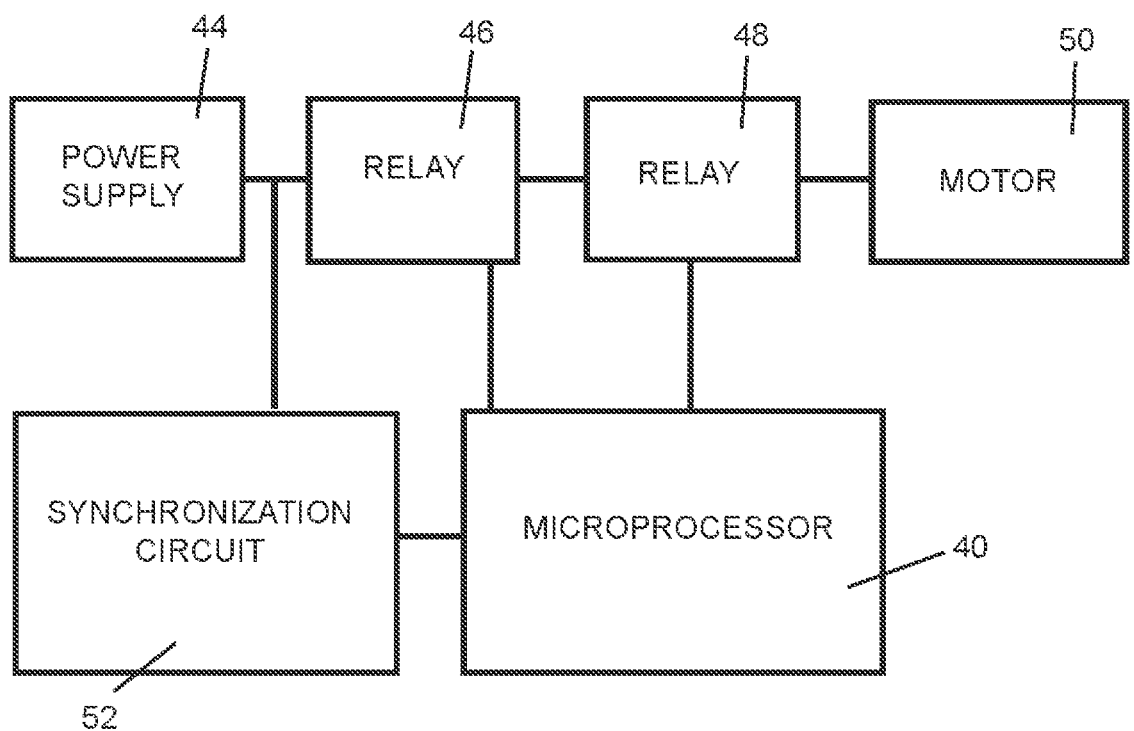
FIG. 4 shows a schematic drawing of a system to provide power to a motor.

FIG. 4 illustrates schematically one way of how two relays and a motor may be arranged in series to provide electricity to the motor. A power supply 44 is connected to a first relay 46. A second relay 48 is connected to the first relay in series, and a motor 50 is also connected to the relays in series. The relays can be controlled by microprocessor 40. When both relays are closed, electricity flows from power supply 44 to motor 50 through relays 46 and 48. However, when either or both of first relay 46 and second relay 48 are open, the circuit is broken and electricity does not flow to motor 50.

Dual relays provide a redundancy that helps prevent unintended activation or unintended running of motor 50, and avoids the possibility of a single-point failure resulting in what might be an unsafe condition. If motor 50 were controlled by only one relay, and that relay failed in a closed state, the motor would continue to run even if a user turned the on/off switch off. Using two relays minimizes the chance of motor 50 running unintentionally because both relays would have to fail closed in order to provide electricity to the motor. Dual relays as described herein, and equivalents, may be referred to as relay means for providing electricity to a motor.

Relays can fail because of arcing between contacts, and arcing happens during normal operation of the relays as circuit currents are established and interrupted. As the contacts move apart to open or break contact, or as the contacts move closer together to close or make contact, electricity can arc between the contacts. In other words, when the contacts are close to each other but not touching, electric sparks can jump across the gap from one contact to the other. This arcing can cause pitting and migration of material on the contacts. Over time, pitting and migration leads to a rough contact surface that reduces the area where the contacts actually touch, and hence increases the resistivity of the contacts. This happens to some extent in all electromechanical relays, but is more pronounced in relays used to provide relatively large electric currents, such as relays used to switch power to motors. Higher contact resistivity, in turn, can lead to a condition where the heat of the conducted current physically welds the contacts together while the contacts are closed, such that the force of the spring in the relay is too weak to separate the contacts when the contacts are to be opened. In that situation, the relay fails and remains closed and does not open, which means electricity continues to flow to the motor even when a user switches the power tool off. This problem increases with the amount of mechanical operations of the relay, and the magnitude of the switched currents involved when opening and closing the contacts.

Relays designed to switch large currents typically include springs strong enough to break the expected microwelds between the contacts. Additionally, the contacts are typically larger to reliably handle the expected current and may include double contacts in series. This type of relay is commonly referred to as a contactor. Stronger springs and larger contacts, however, result in bulkier, more expensive relays that have coils that require greater powering requirements to overcome the additional spring force of the relay. These are more costly and cumbersome to control with a microprocessor due to the fact that microprocessor controlled systems typically do not have the power available to energize the coils of a contactor.

Rather than using larger, heavier, and more expensive contactor relays, table saw 10 uses standard power relays (rated for 30 amps, for example) and then operates and controls the relays in such a way to minimize arcing and welding. This is accomplished in part by opening and closing relays 46 and 48 in a sequence so that only one relay experiences arcing. The relay that experiences arcing deteriorates with use, but the other relay keeps a fresh set of contacts available in case the contacts in the arcing relay weld together. Specifically, when a user pulls paddle 26 out to start the saw, microprocessor 40 closes relay 48 first. No arcing occurs when relay 48 closes because relay 46 is still open. Only after relay 48 closes does microprocessor 40 close relay 46 to provide electricity to motor 50, and when it does, relay 46 experiences the stresses associated with completing or making the circuit. When a user pushes paddle 26 in to stop the saw, microprocessor 40 opens or breaks contact in relay 46 first, thereby interrupting power to the motor, and relay 46 experiences any arcing that might occur while the load in the circuit is disconnecting from the power source. Only after relay 46 is already opened does the microprocessor open relay 48, and no arcing occurs between the contacts of relay 48 because the electric current was already interrupted. In this manner, relay 48 is protected from degradation due to arcing. In this sequence, relay 46 is considered the "make/break relay" because it makes contact to complete the circuit and opens to interrupt the current in the circuit. Relay 48 is considered a "failsafe relay" because it maintains an essentially "clean" set of contacts, and therefore, relay 48 will have a high likelihood of still functioning if relay 46 ever fails. Of course, the situation could be reversed so that relay 48 closes last and opens first, thereby protecting relay 46 from arcing.

Table saw 10 further addresses the problem of arcing and welding by embodying a contact preservation system, also referred to as a switching arc mitigation system, that functions by synchronizing the opening and closing of the relays to correspond to the zero-crossing of the alternating current or AC that powers the saw. With AC, the voltage that powers the motor alternates between a positive and a negative value, such as positive 120 volts and negative 120 volts, for example. As the voltage alternates polarity, it crosses zero. That point is called a zero-cross or the zero-crossing, and for that brief instant there would be no voltage potential appearing across the contacts. There is also a period of time where if the contacts are closed, the instantaneous current flowing in the circuit is zero. This could be referred to as a current zero-crossing. A circuit can be designed to detect voltage zero-crossings, current zero-crossings, or both. When detecting voltage zero-crossings only, the timing of the current zero-crossings can be estimated based on the voltage-to-current relationship of the motor used in the circuit. With zero-cross information, a microprocessor can anticipate a time to open and close the relay contacts so that the contacts experience minimal degradation caused by switching the loads. In table saw 10, a synchronization circuit 52 monitors the AC coming into the saw from power supply 44, and microprocessor 40 operates at least relay 46 and optionally both relays 46 and 48 when there is little or no current flowing, thereby minimizing arcing.

Again, the contact preservation system in the form of synchronization circuit 52 communicates with microprocessor 40 so that the microprocessor can open and close relays 46 and 48 only when the AC line is approaching a zero-crossing. That results in relays 46 and 48 experiencing only minimal electric current when the relays are opened and closed, and less arcing occurs with less current. More specifically, the contacts in relays 46 and 48 are operated only when the currents are below the contact ratings of the relays. Normal AC power in North America is provided at a frequency of 60 Hertz, which means there are 120 zero-crossings every second where the current drops instantaneously to zero. Since there is a lag or delay between the excitation of the coils in the relays and the making or breaking of the contacts in the relays, relays 46 and 48 are controlled in advance of their response times so that the contacts in the relays make or break the circuit when the least amount of stress or damage to the contacts will likely occur. In other words, the coils are de-energized in relays 46 and 48 before a zero-crossing so that the contacts break apart as the motor current is decaying toward zero. Opening the contacts in the relays just before the current drops to zero, as opposed to just after, provides some tolerance for variations in release timing of the contacts in the relays to break apart because the current is decreasing and therefore any arcing will be also decreasing. If the contacts open late after the start of the next current cycle, the arc could establish and continue to supply excitation to the motor until the next zero crossing, thereby stressing and/or damaging the contacts.

Figure 5:
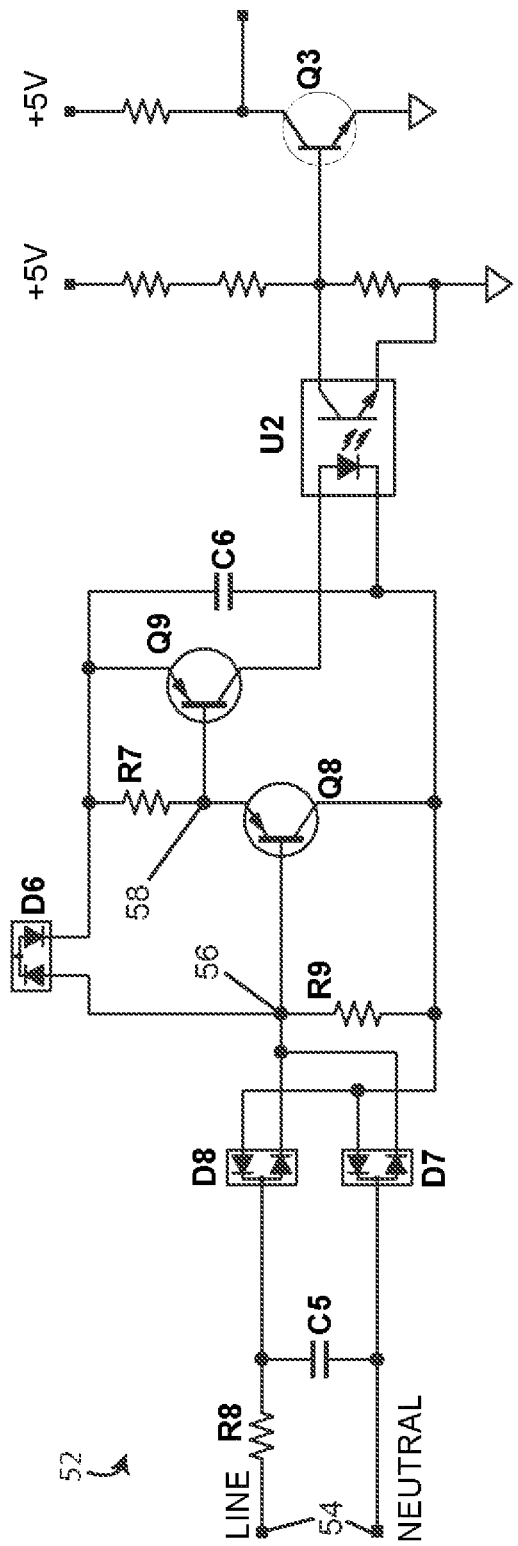
FIG. 5 shows a synchronization circuit.

An example of synchronization circuit 52 is shown in FIG. 5. The circuit is connected across 60 Hz AC line voltage at 54. A resistor labeled R8 acts as a current limiter to restrict the amount of current delivered to the circuit to a level required to power the circuit. R8 also acts to drop the line voltages down to a safe low voltage level that the components in the circuit can tolerate. Capacitor C5 provides filtering for noise appearing on the line that typically occurs at much higher frequencies than the fundamental. Diodes D7 and D8 constitute a diode bridge that provides full wave rectification of the AC, such that the voltage across the circuit is a single polarity, allowing the circuit to detect both positive-going and negative-going zero-crossings of the AC input. Resistor R9 works (along with R8) to set the upper operating bias point of the circuit, as well as provides a discharge path for the charge stored in the circuit just prior to the zero-crossing. Diode D6 (shown in FIG. 5 as two diodes in series, but one diode could be used), when forward biased during the majority of the cycle, acts to store most of the rectified current from R8 into charging a capacitor C6. As the end of an AC cycle nears, and the voltage at the input is approaching a zero-crossing, the voltage across R9 drops below the voltage on capacitor C6 and diode C6 is no longer forward biased. At this point, transistors Q8 and Q9 begin to conduct and, until the zero-crossing occurs, provides a current path to discharge the charge stored in capacitor C6 through a photodiode at the input of an optocoupler U2. These current pulses through U2 begin just prior to the zero-crossing and complete roughly at the point of the zero-crossing. Optocoupler U2 provides isolation and noise immunity between the AC line and the microprocessor ground, and transistor Q3 is used to speed up and reference the output of the optocoupler to the input on the microprocessor. There is a slight delay in the response of the circuit from the actual zero-crossing, but this can be compensated for in the timing of the software. The microprocessor can use these pulses in order to synchronize its internal timing to the externally supplied AC line voltage. It can also uses these pulses to adjust when the relays are opened and closed relative to the zero-crossings in order to prolong the life of the contacts.

Table saw 10 also minimizes the problem of arcing and welding by employing a relay release circuit that collapses the stored magnetic energy in the coil quickly in order to reduce the time for the contacts of the relay to break apart. This is accomplished by allowing the relay coil currents to freewheel through a high voltage clamp diode which results in a rapid collapse in magnetic field strength. The higher the clamping voltage, the faster the current in the coil of each relay dissipates, and the sooner the spring can start to open the contacts. Also, the more rapid the decay in the magnetic field generated by the relay's coil, the greater the rate of change in the force the spring is able to exert on breaking the contacts apart (i.e., more snap in the relay).

Microprocessor 40 uses the determination of an upcoming zero-crossing from synchronization circuit 52, along with an estimate of the time it takes the springs in the relays to break the contacts apart, to discharge the relay coil current in anticipation of the window of time within which the contacts in the relay can be opened with a safe level of current passing through them. The estimate of the time it takes the springs in the relays to break the contacts apart is determined by measuring actual break times of the relays, and the estimate is then programmed into microprocessor 40.

A benefit of configuring a microprocessor and dual relays as described above is that the microprocessor can, using synchronization circuit 52 or a similar circuit, detect if a relay welds closed to create a relay functionality verification system. The microprocessor can then disable the saw so that the saw cannot be used again until it has been repaired. For example, if microprocessor 40, or some other microprocessor, sees motor 50 running after the first or failsafe relay is closed, but while the make/break relay coil is unenergized, it can assume the contacts in the make/break relay have welded closed. Additionally, if motor 50 continues to run after the microprocessor de-energizes the coil in the make/break relay, that relay must be welded closed. The microprocessor can then ignore any subsequent requests to start the motor until the saw has been serviced. Similarly, a microprocessor used to detect blade rotation can use that information to imply the state of relays 46 and 48 because the blade would not rotate if the motor was not energized, and the motor would not be energized if either of relays 46 and 48 were open. Thus, if a microprocessor sees blade rotation, then the relays are closed.

Figure 6:
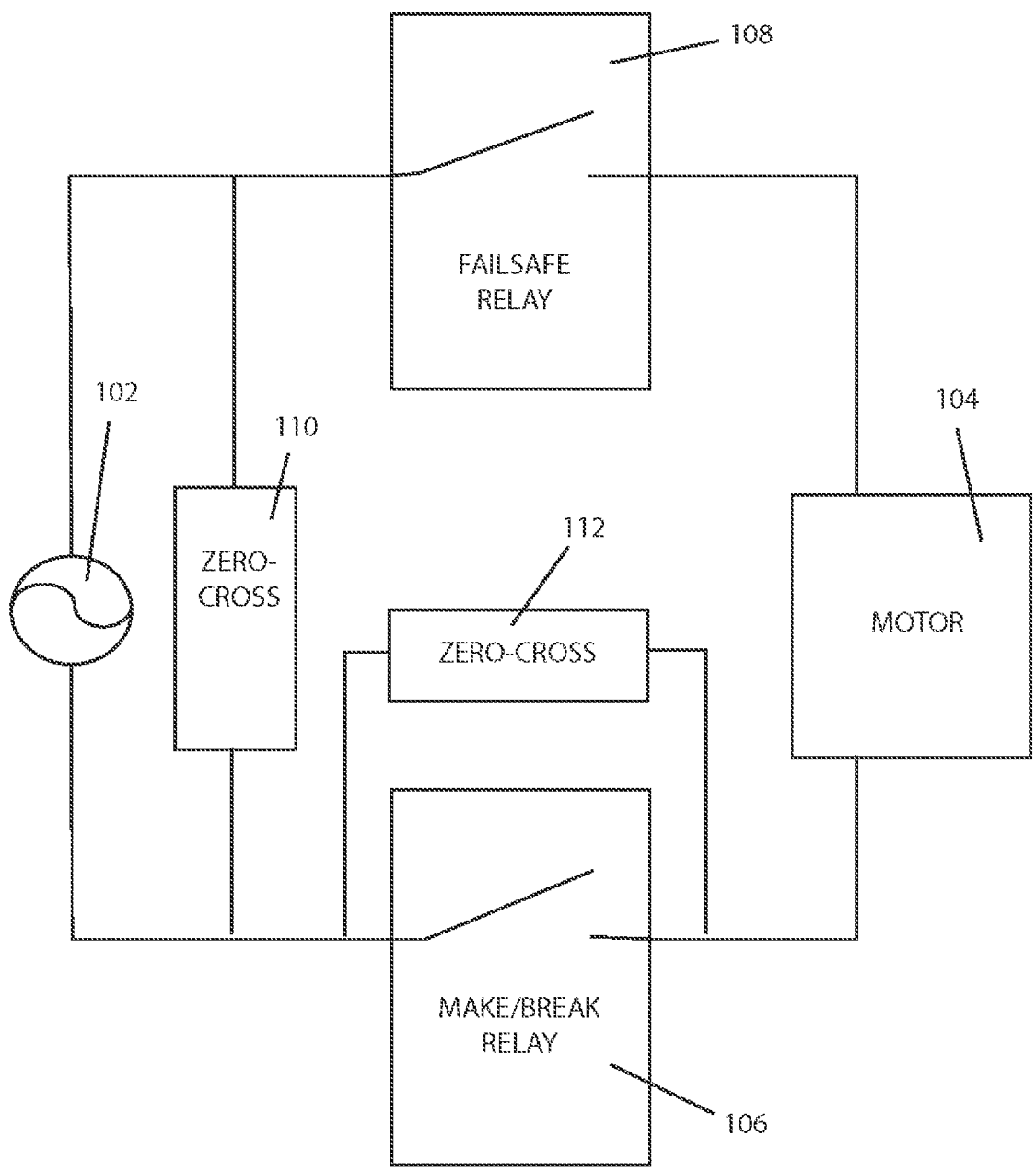
FIG. 6 shows a schematic drawing of a system using a zero-cross detector to determine whether relays have welded closed.

FIG. 6 shows how circuits to detect zero-crossings, such as synchronization circuit 52 discussed above, can be used to detect whether relays have welded closed as part of the relay functionality verification system or relay state monitoring system. FIG. 6 shows a power supply 102, a motor 104, a make/break relay 106, a failsafe relay 108, a first zero-cross detector 110, and a second zero-cross detector 112. The zero-cross detectors may comprise synchronization circuit 52 or other similar circuits. A microprocessor can be used to control relays 106 and 108, as explained previously, and to receive signals or pulses from zero-cross detectors 110 and 112. Zero-cross detectors 110 and 112 monitor the line current but do not conduct current sufficient to power the motor.

When relays 106 and 108 are both closed, the circuit is made, motor 104 runs, and zero-cross detector 110 pulses. Zero-cross detector 110 is always active as long as there is power at the input of the tool, regardless of the motor state. Zero-cross detector 110 is used for relay synchronization purposes and is included in this drawing to reference the prior explanation of the synchronization scheme.

Second zero-cross detector 112 is positioned across the contacts in the make/break relay 106 to detect whether the contacts on the make/break and/or failsafe relays have welded closed. As described previously, when zero-cross detector 112 has AC voltage across it, it produces output pulses once per zero-crossing, and the zero-cross detector itself limits the current flowing through its terminals to a level much too low to allow motor 104 to operate.

In an un-energized resting state, the contacts in both relays 106 and 108 are open and there is no current in the circuit or voltage across make/break relay 106 that could energize zero-cross detector 112. Accordingly, the microprocessor does not see any zero-crossing pulses. In the motor energized state, the contacts in both relays 106 and 108 are closed and the contacts in make/break relay 106 short out the input terminals on zero-cross detector 112. Accordingly, zero-cross detector 112 cannot deliver pulses to the microprocessor.

As the sequenced relay motor shutdown procedure occurs, however, the microprocessor has opportunities to detect welding of relays 106 and/or 108. During shutdown, the microprocessor opens make/break relay 106 first to allow its contacts to carry the arc from the load, as explained. The microprocessor de-energizes the coil on make/break relay 106 and if the spring force is greater than any microwelds established during the run cycle, the contacts will open after the release time of the relay. If the contacts successfully open, voltage from the line through the motor appears across the inputs to zero-cross detector 112, and zero-cross detector 112 pulses to signal the microprocessor that the relay did, in fact, open. If the microprocessor fails to receive these pulses, it can conclude that the contacts in make/break relay 106 never opened, and the microprocessor can then open failsafe relay 108, which has fresh contacts, to stop the motor.

When make/break relay 106 has opened its contacts, zero-cross detector 112 is now powered across the open relay contacts and delivering pulses to the microprocessor. The microprocessor then completes the motor relay sequence by de-energizing the coil on failsafe relay 108. After the release time of the relay, the contacts of 108 completely disconnect the remaining leg of the motor from its connection to the AC line 102, and also interrupts the powering of zero-cross detector 112. As soon as the contacts in failsafe relay 108 opens, the current path through zero-cross detector 112 is blocked and the detector is no longer powered and no longer delivering pulses to the microprocessor. The microprocessor sees the loss of the pulses, and concludes that the contacts of failsafe relay 108 opened correctly. If the pulses keep appearing, the microprocessor concludes that the contacts of failsafe relay 108 have welded shut.

A microprocessor can thus determine the state of both the make/break and failsafe relays by watching for pulses or lack of pulses from a zero-cross detector monitored during the motor run sequence. Microprocessors working with a zero-cross detector, a system to sense whether motors are running, and/or a system to sense blade rotation, and equivalents, may be referred to as detection means for determining whether a relay has welded closed.

In table saws with active injury mitigation systems that use a brake cartridge with a microprocessor in the cartridge, as mentioned previously, the cartridge microprocessor can be used in conjunction with the switchbox microprocessor to control operation of the motor. When a user pulls out paddle 26 to start the saw, for example, both microprocessors can independently monitor the status of switches 36 and 38, and both microprocessors must agree before the relays are closed to supply power to the motor. Either microprocessor, however, can block or stop the motor.

Figure 7:
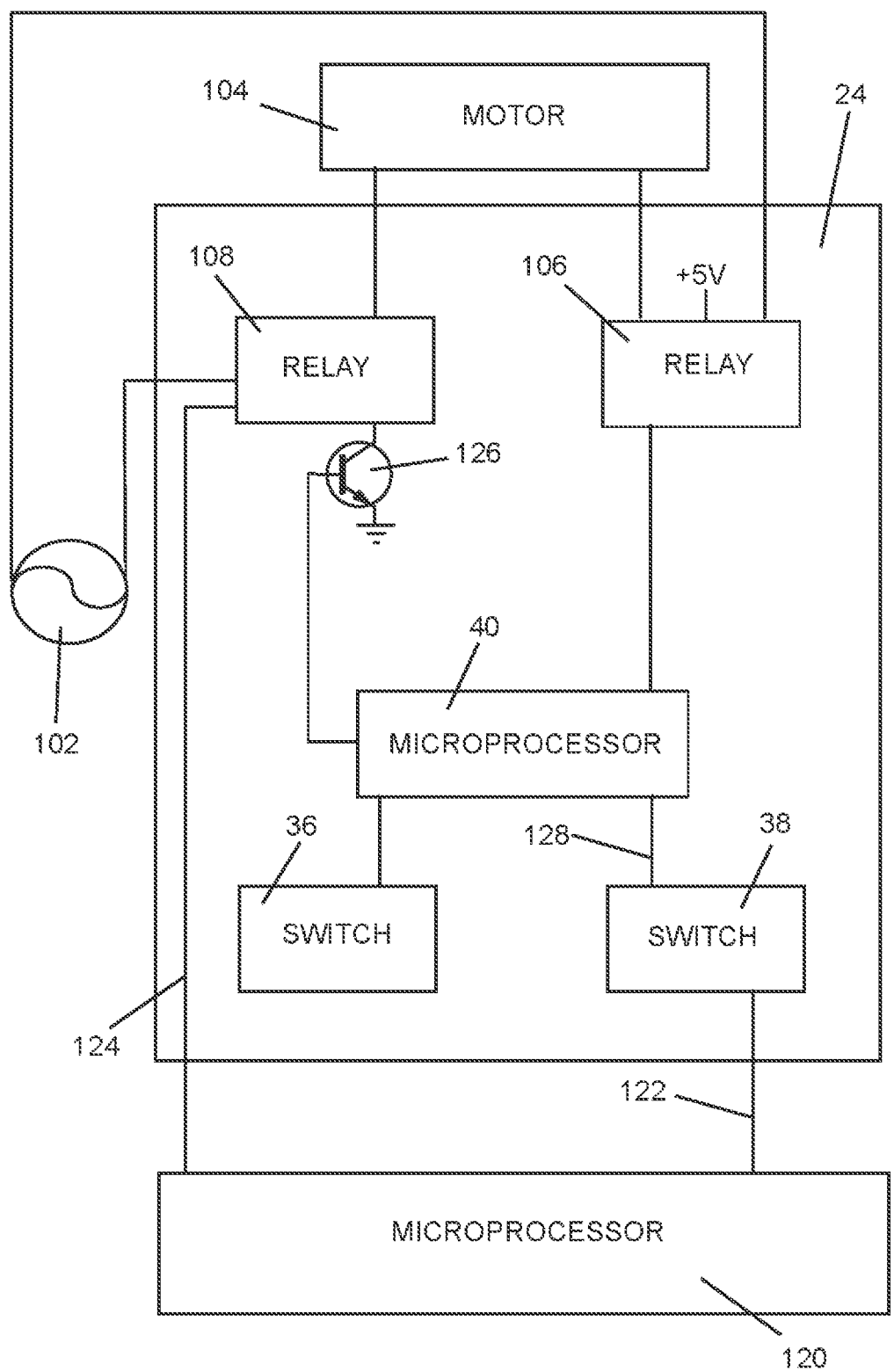
FIG. 7 shows a schematic drawing of a system using two processors to control relays.

FIG. 7 shows schematically an example of how a brake cartridge microprocessor and a switchbox microprocessor can work together to create a plural processor redundant relay control system to control a motor to thereby enhance overall system reliability even in the presence of a fault in one processor. Switchbox 24 includes switches 36 and 38 that communicate with microprocessor 40. One of switches 36 and 38 is also connected to a cartridge microprocessor 120. In the depicted example, switch 38 is connected to cartridge microprocessor 120 through a conductor or line 122. Failsafe relay 108 and make/break relay 106 are connected in series to motor 104 and power supply 102, and the two relays are controlled by switchbox microprocessor 40. Failsafe relay 108 is also connected to cartridge microprocessor 120 by conductor or line 124.

Cartridge microprocessor 120 is programmed to provide voltage to one terminal of the coil in failsafe relay 108 through conductor 124 to energize the coil and sustain the relay contacts in a closed position. The other terminal of the coil in failsafe relay 108 is connected to a transistor 126, which completes the circuit to ground necessary to energize the coil of the relay. Switchbox microprocessor 40 controls the base of transistor 126 so microprocessor 40 controls when the coil in failsafe relay 108 is energized. In this manner, microprocessor 120 and microprocessor 40 work together to control failsafe relay 108. When switchbox microprocessor 40 does not provide an appropriate signal to transistor 126, no current flows through the coil in the failsafe relay and the relay remains open. Similarly, when cartridge microprocessor 120 does not provide excitation to the failsafe relay, the relay remains open. Both microprocessors must signal failsafe relay 108 in order for that relay's contacts to close. Thus, if one microprocessor fails and provides an unintended signal to close the failsafe relay, the relay still will not close unless the other microprocessor also signals the relay to close. It is less likely that two microprocessors will malfunction simultaneously, so use of two microprocessors provides a redundancy that increases the safety of the system.

Cartridge microprocessor 120 is programmed to supply electricity to the coil of failsafe relay 108 only when switch 38 is in an "on" or "run" condition. When switch 38 is closed, line 122 between switch 38 and cartridge microprocessor 120 goes low, for example, and the cartridge microprocessor 120 interprets that low signal as a request to start the motor. Microprocessor 40 will only allow switch 38 to pull this line low when it also sees switch 36 in an "on" or "run" condition. Otherwise, there is no signal to microprocessor 120 to start the motor. Similarly, switchbox microprocessor 40 monitors both switches 36 and 38, and will not allow either relay 106 or 108 to engage unless both switches are in an "on" or "run" condition. Thus, even if switchbox microprocessor 40 or cartridge microprocessor 120 fails in such a way that it signals failsafe relay 108 to close, the relay will not do so unless both microprocessors agree the relays are to close.

Alternatively, switchbox microprocessor 40 and transistor 126 could be connected to make/break relay 106 instead of failsafe relay 108, and in that embodiment, cartridge microprocessor 120 would connect to make/break relay 106. Cartridge microprocessor 120 could also monitor switch 36 instead of switch 38.

Figure 8:
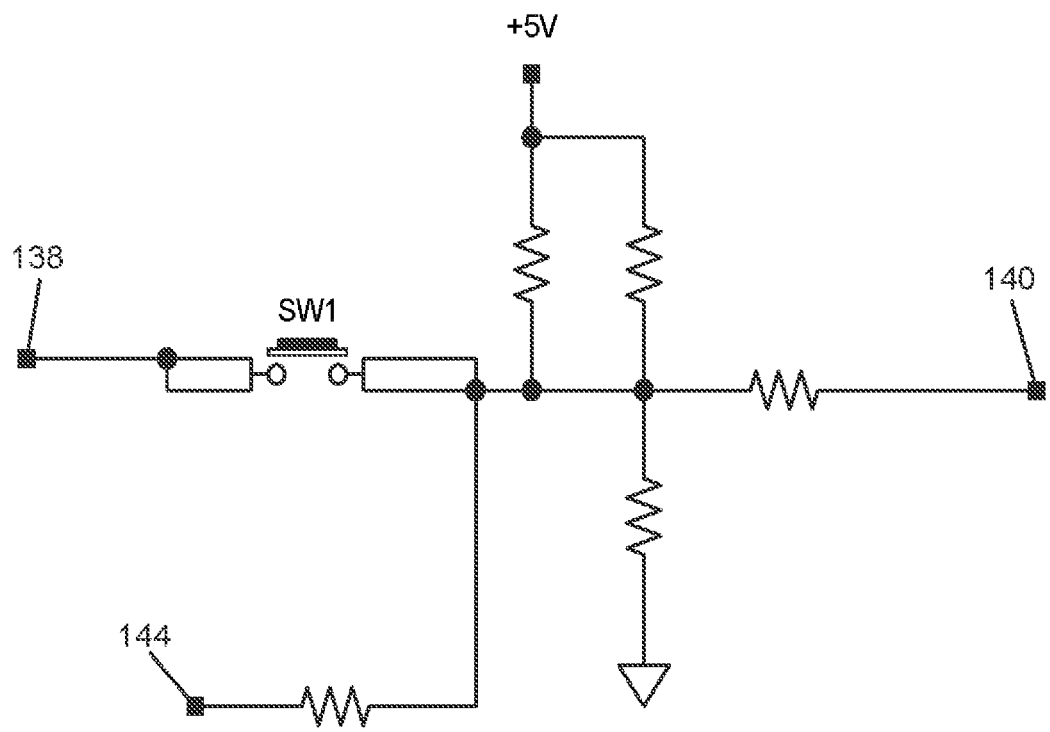
FIG. 8 shows a circuit with a first switch.
Figure 9:
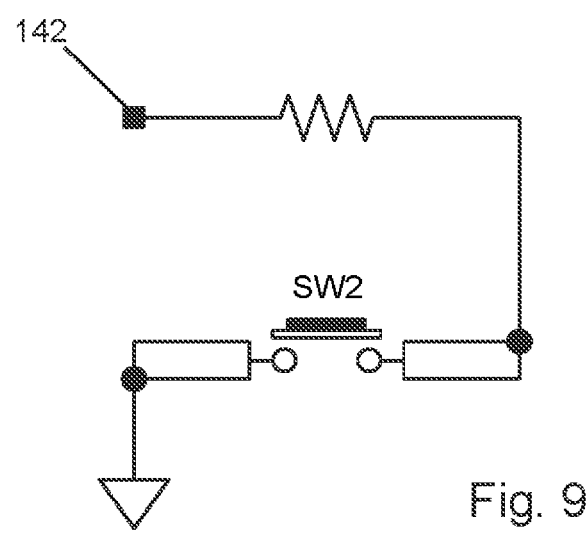
FIG. 9 shows a circuit with a second switch.

FIG. 8 shows an exemplary circuit with a switch SW1 that corresponds to switch 38 in FIG. 7, and FIG. 9 shows an exemplary circuit with a switch SW2 that corresponds to switch 36. Both switches SW1 and SW2 are opened and closed mechanically, such as by pushing and releasing a button. One side of switch SW1 is connected to switchbox microprocessor 40 at 138. That connection is an output from the microprocessor, and the output from the microprocessor is normally open or tri stated so it cannot sink or source current. The other side of switch SW1 is connected to cartridge microprocessor 120 at input 140, and the signal at input 140 is normally high (approximately 3.3 volts). Cartridge microprocessor 120 is programmed to start the motor when the signal at input 140 goes low, provided any other monitored conditions are satisfied. The signal at input 140 will stay high, however, regardless of whether switch SW1 is open or closed, as long as the signal at output 138 is also high (switch SW1 is tri-stated). Only when the switchbox microprocessor 40 actively drives its output 138 low and switch SW1 is closed will the signal at input 140 go low. Switchbox microprocessor 40 is programmed to output a low signal to switch SW1 at output 138 only when switch SW2 is closed. Switch SW2 (shown in FIG. 9) is connected at one side to ground and at the other side to an input 142 on switchbox microprocessor 40. Input 142 is normally terminated to a logic 1 level (high signal) using what is termed a pull-up resistance. When a user closes switch SW2, this drives input 142 to a logic 0 level (low signal), and after a brief sampling and de-bouncing delay, the switchbox microprocessor 40 will then attempt to read the other switch SW1 As described above, the switchbox microprocessor 40 will then drive signal output 138 with a logic low signal (connection to ground). If switch SW1 is also closed, then the signal at input 140 to the cartridge microprocessor 120 goes low to signal the cartridge microprocessor to start the motor. Microprocessor 40 will detect the closed logic 0 state of SW1 using analog sensing line 144. In this manner, both switches SW1 and SW2 must be closed to signal both microprocessors to start the motor.

Switchbox microprocessor 40 can also monitor the status of the line between switch SW1 and input 140 to cartridge microprocessor 120. If that line became worn, crimped or damaged, the signal on that line may be grounded when it should have a voltage, it may have a lower voltage than it should have due to a connection with some unknown load, or it may have a higher voltage than it should have due to a connection to a voltage supply. As a result, the cartridge microprocessor may signal the motor to start or stop when it should not. Accordingly, in the circuit depicted in FIG. 8, the switchbox microprocessor monitors the signal on that line. Specifically, input 144 on switchbox microprocessor 40 connects to the line between switch SW1 and input 140 and monitors the line for either high or low voltage. When switch SW1 is open, input 144 should see a high voltage (approximately 3.3 volts). If it does not, then switchbox microprocessor 40 knows there is a malfunction, such as the line between switch SW1 and input 140 has become grounded or brake cartridge microprocessor 120 has malfunctioned.

When the signal at switchbox microprocessor output 138 is low, if input 144 sees a high voltage, then switch SW1 has not closed. If the signal at switchbox microprocessor output 138 is actively driven to ground and the signal at input 144 is also low then switch SW1 has closed. Monitoring the status of the line between switch SW1 and cartridge microprocessor 120 further enhances the safety and reliability of the motor control system.

With switches configured as depicted in FIGS. 8 and 9, when switch SW2 opens, input 142 returns to a logic level 1 state and switchbox microprocessor 40 then tri-states output 138 to an open drain condition, which is equivalent to forcing switch SW1 to open because when output 138 tri-states, it breaks the path to ground. Switchbox microprocessor 40 will then initiate a relay shutdown sequence regardless of whether switch SW1 is open or closed. At the same time, when output 138 tri-states, input 140 will also go high and cartridge processor 120 will initiate its own relay shutdown sequence. Similarly, when switch SW1 opens, the switchbox microprocessor 40 detects the high signal (approximately 3.3 volts) across the switch and tri-states the output 138 without regard to whether switch SW2 is open or closed. The switchbox and cartridge microprocessors also then initiate relay shutdown sequences.

In control systems as described above, the switchbox microprocessor, the make/break and failsafe relays, and the synchronization/zero-cross detection circuits can all be located in switchbox 24. Standard AC power is routed to the switchbox, and then flows from the switchbox through the relays to motor 50 when the relays are sequenced to turn the motor on. The switchbox can also include power supply circuitry to supply low voltage direct current to the switchbox and cartridge microprocessors, the make/break and failsafe relays, the synchronization/zero-cross detection circuit(s), and any other low voltage components.

The above described system can be considered a layered redundant motor control system. Each layer of such a system would be made up of one of the redundant switches, redundant relays or plural processor relay control. The presence of more than a single redundant motor control layer desirably enhances overall reliability of the operation of the power tool.

With control systems as described above, a method to shut down the motor may comprise the following steps:

1) A user flips a switch that sends a signal to a microprocessor to turn the motor off (e.g., a user pushes paddle 26 in), or the microprocessor detects a condition which indicates the motor should be turned off.
2) The microprocessor turns a first relay off (i.e., opens or breaks contact in the relay) in a synchronized fashion, where the first relay is one of two relays in series, such as relay 46. The relay opening can be synchronized to the zero-crossings of the AC line to minimize damage to the relay.
3) The microprocessor waits a few AC cycles to confirm that power to the motor has been shut off.
4) If power to the motor has been shut off, the microprocessor turns the second relay off (i.e., opens or breaks contact in the relay), such as relay 48.
5) If power to the motor has not been shut off, the microprocessor turns the second relay off in a synchronized fashion and disables subsequent activation of the motor.

The power tool that implements the shut-down method described above may follow the steps listed below to start the motor:

1) The user flips a switch that sends a signal to a microprocessor to turn the motor on (e.g., a user pulls paddle 26 out).
2) The microprocessor turns one of the two relays (i.e., closes or makes contact in the relay), such as relay 48.
3) The microprocessor waits a few AC cycles to check whether the motor runs.
4) If the microprocessor detects that the motor is running, the microprocessor shuts off both relays in a synchronized fashion and disables subsequent activation of the motor.
5) If the motor does not run, the microprocessor turns on the other relay (i.e., closes or makes contact in the relay) in a synchronized fashion, such as relay 46.

As part of these steps, a microprocessor can check to see if the motor is spinning or check for pulses from a zero-cross detector, as explained, to determine if relays have welded closed.

In a table saw such as table saw 10, the blade can be supported so that a user can change the tilt of the blade relative to the table to make angled cuts. Tilting the blade is accomplished in some table saws by turning a handwheel, which then turns gears to tilt the blade. In other table saws the blade is tilted by releasing a clamp and moving a handle to the side to cause the blade to tilt. Still other tilt mechanisms are described in U.S. patent application Ser. No. 13/946,101, titled "Blade Tilt Mechanisms for Table Saws," filed Jul. 19, 2013, which is incorporated herein by reference. In table saws where the blade is configured to tilt, a tilt sensor or accelerometer can be coupled to the blade tilting mechanism and used in the saw to detect the tilt of the blade or the tilt of the arbor supporting the blade. The tilt sensor or accelerometer can be used with a microprocessor and a display to inform a user how much the blade is tilted. This information can also be used, for example, to determine if the tool is in an unsafe orientation/position or if the tool has fallen over and is no longer upright.

A table saw such as table saw 10 can also include a Bluetooth or other wired or wireless connection so that the saw can communicate with a smartphone or other device. Such a connection can be used to diagnose problems with the saw from a location remote from the saw. Such a connection can also be used to transmit usage information and other information about the saw to a location remote from the saw. Such a connection could also be used to update software in the one or more microcontrollers in the saw and to potentially enable, disable, or monitor various functionalities of the saw. Similarly, table saw 10 can be equipped to receive USB drives, flash drives, or other data storage devices to output information about the saw and/or to receive updates to software or new software.

INDUSTRIAL APPLICABILITY

The systems described herein are applicable to power tools.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method for shutting off an electric motor in a power tool used by a user, where the power tool has a switch, a microprocessor, a first relay, and a second relay in series with the first relay, where the first and second relays are part of a circuit to provide AC power to the motor and where the circuit includes an AC line, the method comprising:
   the user triggering the switch, where triggering the switch sends a signal to the microprocessor to turn off the motor;
   the microprocessor, upon receipt of the signal, breaking contact in the first relay when the AC line is approaching a zero-crossing;
   the microprocessor checking whether AC power to the motor has been shut off;
   if AC power to the motor has been shut off, the microprocessor breaking contact in the second relay; and
   if AC power to the motor has not been shut off, the microprocessor breaking contact in the second relay when the AC line is approaching a zero-crossing.

2. The method of claim 1, further comprising the microprocessor disabling subsequent activation of the motor if AC power to the motor was not shut off after opening of the first relay.

3. A method for starting an electric motor of a power tool used by a user, where the power tool has a switch, a microprocessor, a first relay, and a second relay in series with the first relay, where the first and second relays are part of a circuit to provide AC power to the motor and where the circuit includes an AC line, the method comprising:
   the user triggering the switch, where triggering the switch sends a signal to the microprocessor to turn on the motor;
   the microprocessor making contact in the second relay upon receipt of the signal;
   the microprocessor checking whether the motor is running;
   if the motor is running, the microprocessor breaking contact in the second relay when the AC line is approaching a zero-crossing; and
   if the motor is not running, the microprocessor making contact in the first relay when the AC line is approaching a zero-crossing.

4. The method of claim 3, further comprising the microprocessor disabling subsequent activation of the motor if the motor was running after contact was made in the second relay and before contact was made in the first relay.

* * * * *